United States Patent
Kornylo et al.

(10) Patent No.: US 7,070,199 B2
(45) Date of Patent: Jul. 4, 2006

(54) MECHANISM FOR INTERLOCKING AN INSTRUMENT PANEL TO AN INFLATABLE RESTRAINT MODULE

(75) Inventors: Walter P Kornylo, Livonia, MI (US); Karthik V. Kumar, Farmington Hills, MI (US); Eric R. Langley, Howell, MI (US)

(73) Assignee: Intier Automotive Inc., Newmarket (CA)

( * ) Notice: Subject to any disclaimer, the term of this patent is extended or adjusted under 35 U.S.C. 154(b) by 64 days.

(21) Appl. No.: 10/348,390

(22) Filed: Jan. 21, 2003

(65) Prior Publication Data

US 2004/0140650 A1 Jul. 22, 2004

(51) Int. Cl.
B60R 21/16 (2006.01)
(52) U.S. Cl. .................... 280/728.2; 280/732
(58) Field of Classification Search .......... 280/728.2, 280/732, 728.3
See application file for complete search history.

(56) References Cited

U.S. PATENT DOCUMENTS

| | | |
|---|---|---|
| 5,127,669 A | 7/1992 | Suran et al. |
| 5,135,252 A | 8/1992 | Suran et al. |
| 5,145,207 A | 9/1992 | Bederka et al. |
| 5,242,192 A | 9/1993 | Prescaro et al. |
| 5,275,432 A | 1/1994 | Pray et al. |
| 5,333,901 A | 8/1994 | Barnes |
| 5,378,012 A | 1/1995 | Seiki et al. |
| 5,529,332 A | 6/1996 | Wipasuramonton |
| 5,540,460 A | 7/1996 | Wipasuramonton |
| 5,566,977 A | 10/1996 | Wipasuramonton |
| 5,755,460 A | 5/1998 | Barnes et al. |
| 5,803,487 A | 9/1998 | Kikuchi et al. |
| RE36,167 E | 3/1999 | Barnes |
| 6,012,735 A | 1/2000 | Gray et al. |
| 6,299,198 B1 | 10/2001 | Nakashima et al. |

*Primary Examiner*—Paul N. Dickson
*Assistant Examiner*—Joselynn Y. Sliteris
(74) *Attorney, Agent, or Firm*—Honigman Miller Schwartz and Cohn LLP

(57) ABSTRACT

An inflatable restraint module comprises an inflatable restraint canister including an inflatable restraint, an instrument panel, and a mechanism for interlocking the instrument panel to the inflatable restrain. The mechanism includes an attachment portion attached to a chute of the inflatable restraint module, a shaft portion extending from the attachment portion, and an engagement flange extending from the shaft portion. Upon upward displacement of the chute as a result of deployment of the inflatable restraint, the mechanism concurrently shifts with the chute, causing the engagement flange to shift from a free-floating, at-rest position to an engagement position with a structural member for controlling the relative movement between the chute and the instrument panel.

29 Claims, 4 Drawing Sheets

MECHANISM FOR INTERLOCKING AN INSTRUMENT PANEL TO AN INFLATABLE RESTRAINT MODULE

TECHNICAL FIELD

The present invention relates to inflatable restraint modules, and in particular to a mechanism for interlocking an instrument panel to an inflatable restraint module.

BACKGROUND OF THE INVENTION

An inflatable restraint deploys rearwardly in a vehicle toward a passenger or occupant of the vehicle. The inflatable restraint, such as an airbag, may be located behind an instrument panel area, such as a dashboard. An inflatable restraint module may include an inflatable restraint canister that includes the inflatable restraint and an inflatable restraint chute. The dashboard may include an inflatable restraint door that is formed in the dashboard. Proper deployment of the inflatable restraint is necessary for the safety of the occupants of the vehicle. However, the inflatable restraint module and/or instrument panel may undergo mechanical failure or misalignment, such as a displacement of the dashboard, during the deployment of the inflatable restraint, thereby resulting in improper deployment of the inflatable restraint.

Thus, a need exists for an improved inflatable restraint module that minimizes mechanical failure of the inflatable restraint module and/or instrument panel and maintains proper alignment of the inflatable restraint during deployment of the inflatable restraint.

SUMMARY OF THE INVENTION

The inventors of the present invention have recognized these and other problems associated with conventional inflatable restraint modules. To this end, the inventors have developed a mechanism for interlocking an instrument panel to an inflatable restraint module including an attachment portion attached to a chute of the inflatable restraint module, a shaft portion extending from the attachment portion, and an engagement flange extending from the shaft portion. Upon upward displacement of the chute as a result of deployment of the inflatable restraint, the mechanism concurrently shifts with the chute, causing the engagement flange to shift from a free-floating, at-rest position to an engagement position with a structural member.

In another aspect of the invention, an inflatable restraint module comprises an inflatable restraint canister including an inflatable restraint, an instrument panel including an inflatable restraint door, the instrument panel being affixed to a structural member, an inflatable restraint chute extending from the instrument panel, and a mechanism attached to the chute and including an engagement flange. Upon upward displacement of the chute as a result of deployment of the inflatable restraint, the mechanism concurrently shifts with the chute, causing the engagement flange to shift from a free-floating, at-rest position to an engagement position with the structural member.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 2:
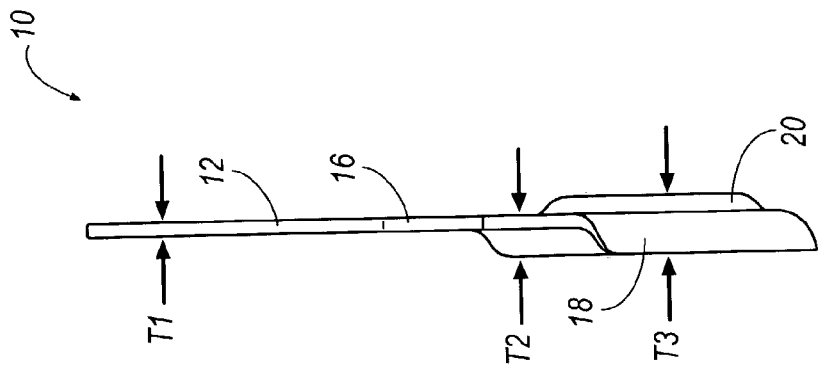
FIG. 2 is rear view of the mechanism of FIG. 1.
Figure 1:
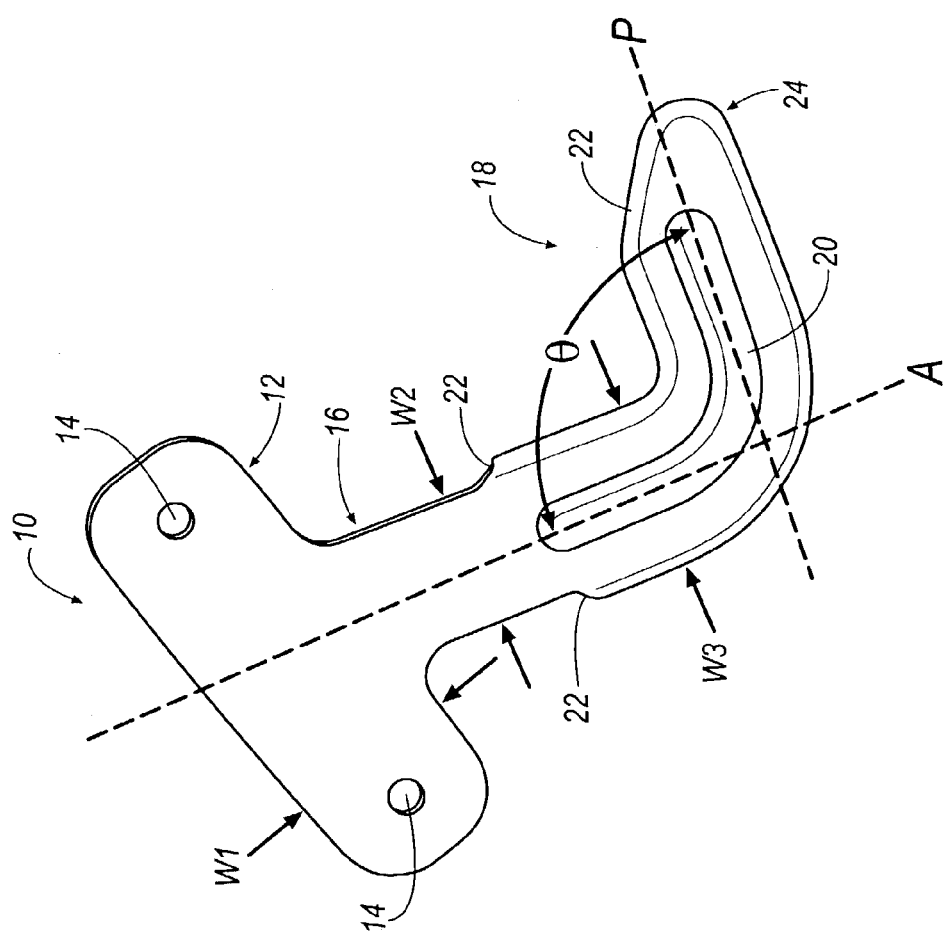
FIG. 1 is a side view of a mechanism for interlocking an instrument panel to an inflatable restraint module according to an embodiment of the invention.

Referring to FIGS. 1 and 2, a mechanism 10 for interlocking an instrument panel to an inflatable restraint module is shown according to an embodiment of the invention. The mechanism 10 may be made of any desirable material, such as steel, that may be stamped or formed using any desirable process known in the art. The inventive feature and utility of the mechanism 10 is described in more detail below. Directions used in the description of the invention such as "rearward" and "vertical" are meant to establish a frame of reference in describing the invention and are not meant to restrict the or limit patentable features of the invention as described in the claims below.

The mechanism 10 generally comprises an attachment portion 12 with fastener passages 14, a shaft portion 16, and an engagement flange 18 having any desirable widths W1, W2, and W3, as seen in FIG. 1, respectively, and thicknesses, T1, T2, and T3, as seen in FIG. 2, respectively. The engagement flange 18 may also include a least one stiffening rib 20 that may be offset or centrally located about a central axis, A, which is referenced from the mid-section of the shaft portion 16. The stiffening rib 20 may be in the form of a groove or slot having an approximate thickness, (T3–T2), which is approximately the thickness of the engagement flange 18 minus the thickness of the lower half of the shaft portion 16. Alternatively, rather then being stamped in the engagement flange 18, the stiffening rib 20 may be solid and integral with the engagement flange 18.

Referring to FIG. 1, the engagement flange 18 may also include beveled portions 22 located near the shaft portion 16 and a nose portion 24. The beveled portions 22 may be located at any desirable location of the mechanism 10 to promote installation of the mechanism 10 about the inflatable restraint module 11. Also, in order to promote installation of the mechanism 10 about the inflatable restraint module 11, the engagement flange 18 may be further defined to extend from the shaft portion 16 at any desirable angle, θ, which is referenced from the central axis, A. According to the illustrated embodiment of the invention, the engagement flange 18 extends from the shaft portion 16 at an angle, θ, such that the mechanism resembles the letter "J." The angle, θ, is referenced from the central axis, A, and an axis, P, that is substantially perpendicular to the axis, A. In the illustrated embodiment, the angle, θ, is greater than or equal to about 90°. However, it will be appreciated that the angle, θ, can be less than 90°.

Figure 3:
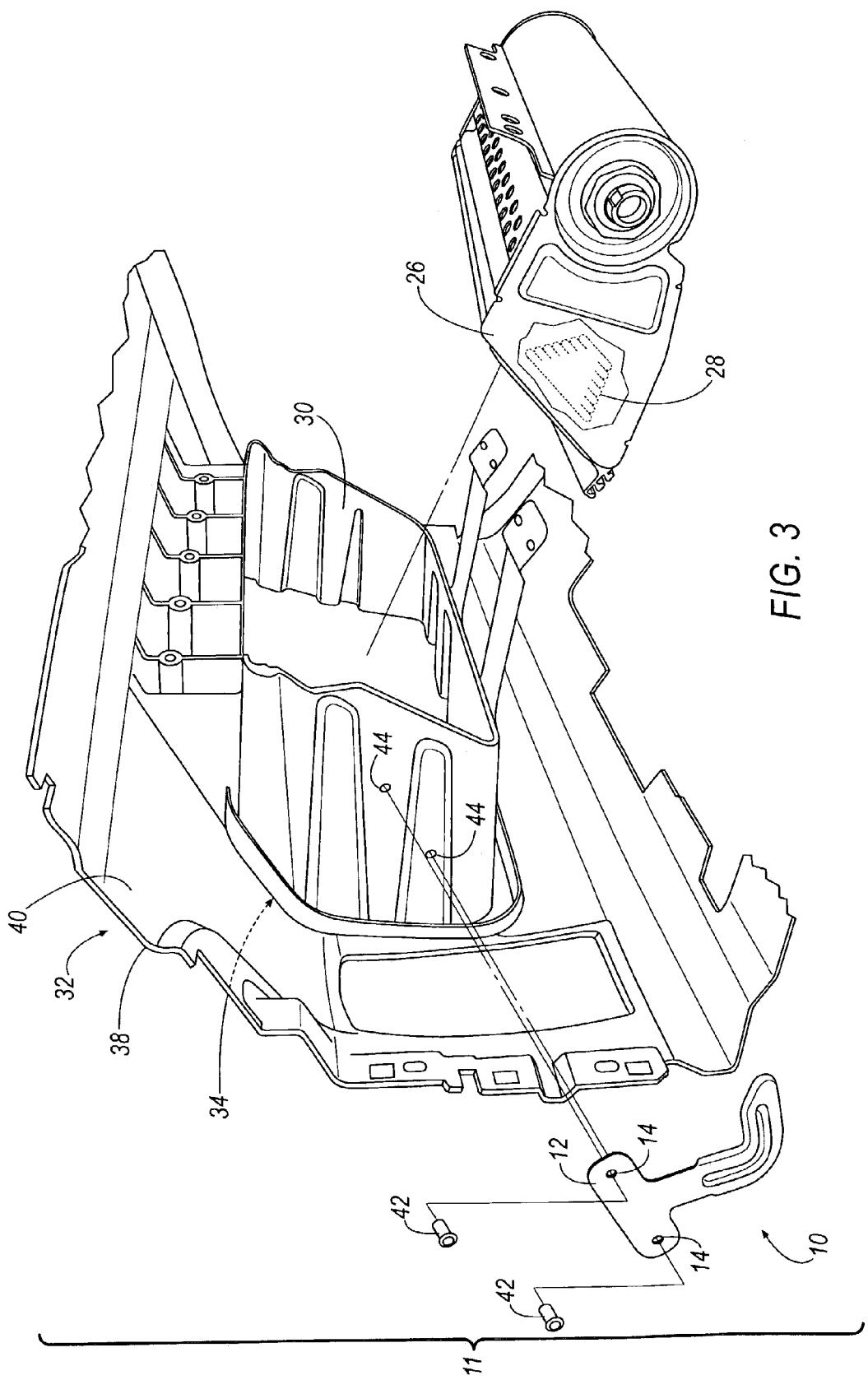
FIG. 3 is an exploded, cutaway, rear perspective view of an inflatable restraint module and the mechanism of FIG. 1.
Figure 4A:
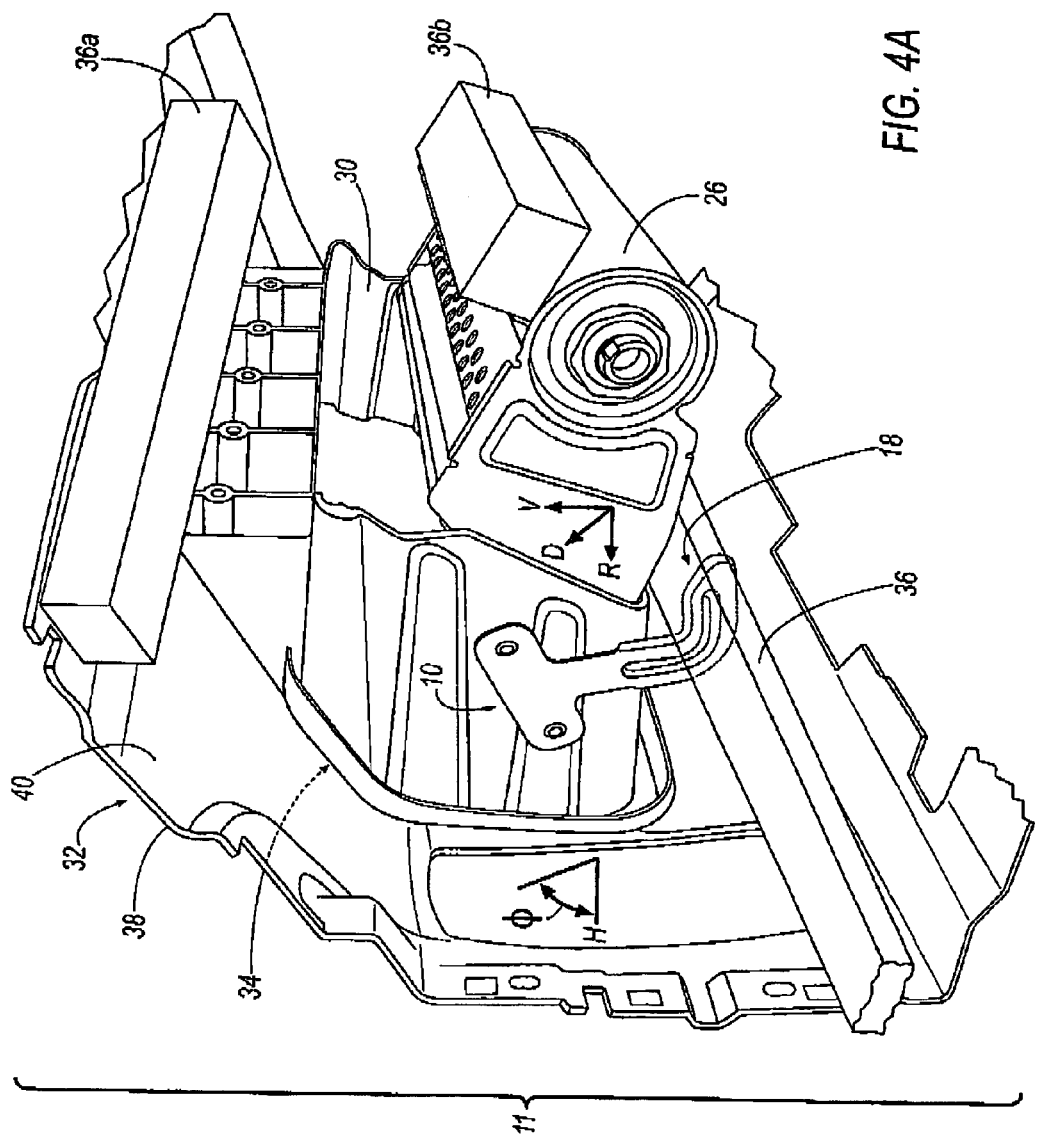
FIG. 4A is a cutaway rear perspective view of a fully assembled inflatable restraint module including the mechanism of FIG. 1 according to one embodiment of the invention.
Figure 4B:
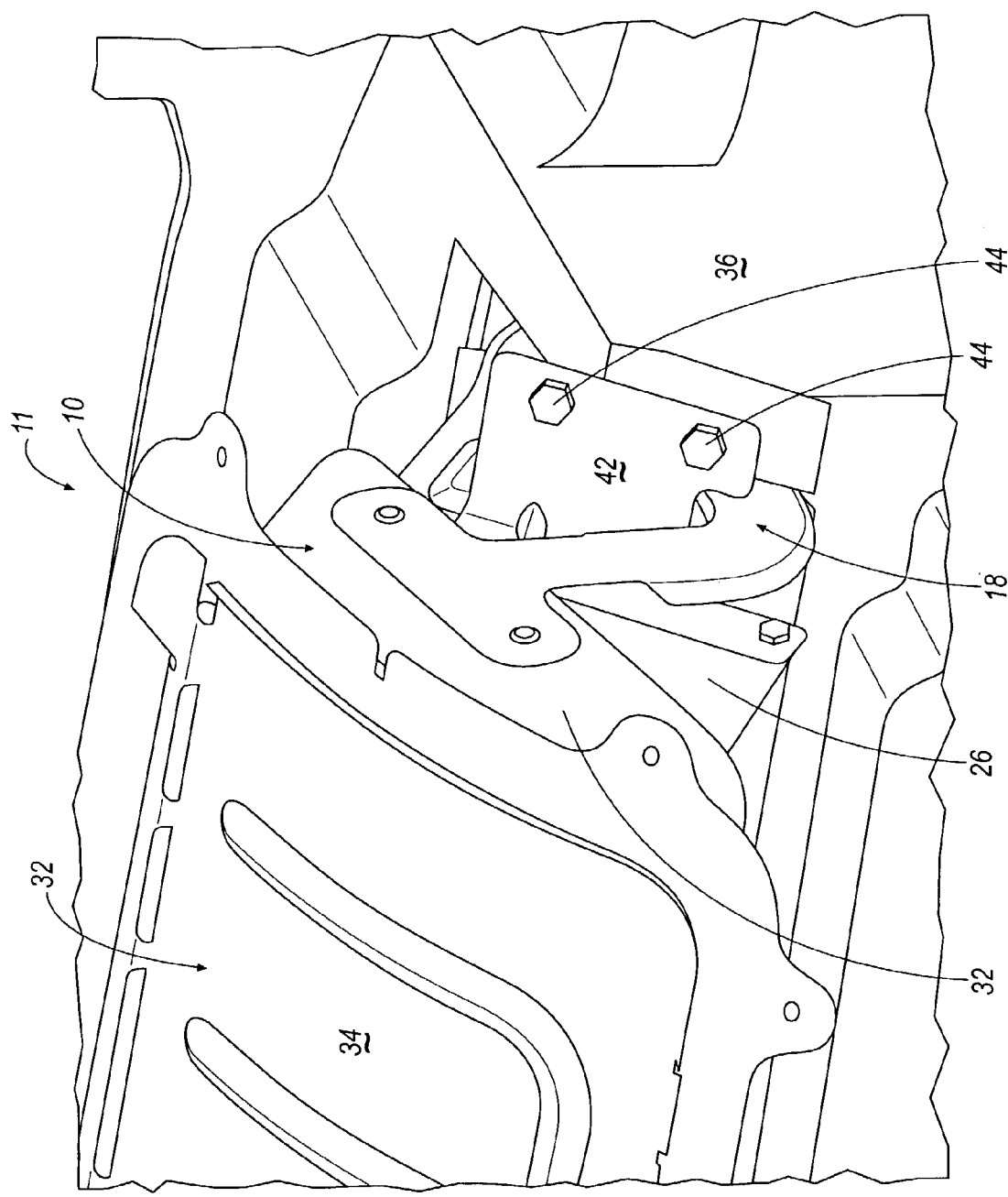
FIG. 4B is a cutaway front perspective view of a fully assembled inflatable restraint module including the mechanism of FIG. 1 according to another embodiment of the invention.

Referring to FIGS. 3–4B, the inflatable restraint module 11 comprises the mechanism 10, an inflatable restraint canister 26 including the inflatable restraint 28, an inflatable restraint chute 30, and an instrument panel or dashboard 32 including an inflatable restraint door 34 that is laser etched or otherwise formed in the dashboard 32 by using any means well known in the art. As seen in FIG. 4A, the dashboard 32 and inflatable restraint canister 26 may each be affixed to a structural member 36a, 36b, respectively, which may referred to in the art as a "cross-car beam" or a "mag-beam" that may be located behind a firewall (not shown). Alternatively, the dashboard 32 and inflatable restraint canister 26 can be directly or indirectly attached to the same structural member or separate structural members 36a, 36b, as illustrated.

The dashboard 32 may include at least a soft, aesthetically pleasing skin material 38 that is visible to the occupants of the vehicle, and a rigid substrate 40 comprising any desirable thermoplastic resin, such as, for example, Acrylnitril-Butadien-Styrol-Copolymere (ABS), Polypropylene (PP), Polycarbonate-Acrylnitril-Butadien-Styrol-Copolymere (PC/ABS), Thermoplastic Olefin (TPO), or polyvinyl chloride (PVC). The inflatable restraint chute 30 may be integral with and extend from the substrate 40. Alternatively, the inflatable restraint chute 30 may be a separate component comprising metal that is attached to the substrate 40 with fasteners or a desirable adhesive. As illustrated in FIG. 3, fasteners 42, such as rivets, bolts, or the like, may pass through the fastener passages 14 on the attachment portion 12 and substrate fastener passages 44 in the chute 30. Although the substrate fastener passages 44 are disposed about the chute 30, the attachment portion 12 may comprise an alternative structure that permits attachment of the mechanism 10 directly to the dashboard 32.

In a deployment situation, the inflatable restraint 28 inflates and deploys through the inflatable restraint door 34 towards an occupant of the vehicle. As seen in FIG. 4A, upon deployment of the inflatable restraint 28, deployment forces, which are generally indicated by deployment geometry including a rearward vector, R, a vertical vector, V, and a thrust vector, D, occur about the inflatable restraint module 11. The combination of the rearward vector, R, and the vertical vector, V, result in the thrust vector, D, and are each generally directed towards the occupant and the windshield, respectively. The thrust vector, D, may comprise any desirable angle, such as, for example, approximately 36 degrees, which is referenced from the rearward vector, R.

Essentially, the deployment force occurring about the inflatable restraint module 11 when the inflatable restraint deploys imposes stresses on the inflatable restraint module 11, particularly on the substrate 40 and the chute 30, and attempts to cause upward displacement of the inflatable restraint module 11. Generally, the vertical vector, V, comprises most of the deployment force that attempts to cause upward displacement of the chute 30 and the dashboard 32. However, most of the deployment force associated with the vertical vector, V, is harnessed by the mechanism 10.

During displacement of the chute 30 and dashboard 32, the mechanism 10, which is attached to the chute 30, concurrently shifts with the chute 30 and dashboard 32. Accordingly, the engagement flange 18 shifts from its "at-rest position" and engages a structural member 36, which is illustrated to be attached to the inflatable restraint canister 26. However, the engagement flange 18 may be designed to engage another structural member that is remote from or attached to the inflatable restraint canister 26, if desired. Engagement of the mechanism 10 against the structural member 36 ceases and restricts upward displacement of the chute 30 and dashboard 32, thereby maintaining the relative positions of the chute 30 and the dashboard 32.

Referring to FIG. 4B, another embodiment of the inflatable restraint module 11 arrangement is illustrated. In this embodiment, the engagement flange 18 of the mechanism 10 is designed to be in an initial "at position" that will ultimately engage a fin 42 that is integral with and extends from the inflatable restraint canister 26 upon deployment of the inflatable restraint 28. The fin 42 is hard attached to the structural member 36 with any desirable fastener such as a bolt 44. Although the inflatable restraint canister 26 includes a fin, it is contemplated that the inflatable restraint canister 26 may include other features or designs employing other members that may be attached to the structural member 36. The mechanism 10 operates and functions in a similar manner as described above with respect to the embodiment illustrated in FIG. 4A. Specifically, the mechanism 10, which is attached to the chute 30, concurrently shifts with the chute 30 and dashboard 32 and ceases and restricts upward displacement of the chute 30 and dashboard 32, thereby maintaining the relative positions of the chute 30 and the dashboard 32.

According to the illustrated embodiments of the invention, the engagement flange 18 of the mechanism 10 may be spaced from the structural member 36 at any desirable clearance in the "at rest position," such as, for example, a clearance approximately equal to 3 mm. Because the engagement flange 18 is spaced from the structural member 36 or fin 42, the mechanism 10 is considered to be a "free-floating" component that reduces undesirable noise, vibration and harshness (NVH), such as rattle, during operation of the vehicle. The "free floating" aspect of the mechanism 10 also retains head impact characteristics of the inflatable restraint module 11 under occupant loading of the inflatable restraint 28 such that the dashboard 32 may bend or flex so that absorption of impact energy transmitted to the inflatable restraint 28 may be expedited about the inflatable restraint module 11.

As illustrated in FIG. 4A, the mechanism 10 may be implemented in the inflatable restraint module 11 having impact geometry including an inflatable restraint deployment angle, $\phi$, which is referenced from a horizontal line, H, that is generally parallel from a vehicle floor or base pan (not shown). Accordingly, the mechanism 10 may be implemented in inflatable restraint modules 11 having inflatable restraint deployment angles, $\phi$, that comprises a deployment force that urges upward displacement of the chute 30 and dashboard 32 towards the vertical vector, V. The inflatable restraint deployment angle, $\phi$, may comprise any desirable angle, such as, for example, approximately greater than or equal to 30 degrees.

Accordingly, the mechanism 10 restricts a deployment force that urges upward displacement of the chute 30 and dashboard 32 at any distance, such as, for example, a distance approximately equal to 50 mm or more, thereby impeding resulting stresses of the substrate 40 that may otherwise fracture a portion of the inflatable restraint module 11, such as the dashboard 32, causing improper deployment of the inflatable restraint 28. Thus, the deployment geometry including vectors, R, V, and D, may be maintained in order to maintain proper deployment of the inflatable restraint 28.

Even further, in a head impact situation, the mechanism 10 permits the inflatable restraint module 11 to go into tension or flex upon restricting a deployment force that urges upward displacement of the chute 30 and dashboard 32. Thus, the loading geometry including an inflatable restraint deployment angle, $\phi$, may be maintained, thereby retaining head impact characteristics of the inflatable restraint module 11 under occupant loading of the inflatable restraint 28

It should be understood that the aforementioned and other various alternatives to the embodiments of the invention described herein may be employed in practicing the invention. It is intended that the following claims define the scope of the invention and that the method and apparatus within the scope of these claims and their equivalents be covered thereby.

What is claimed is:

1. An inflatable restraint module, comprising:
   an inflatable restraint canister including an opening for allowing an inflatable restraint to be deployed therethrough;
   an inflatable restraint chute having a passageway in communication with the opening of the canister; and
   a mechanism attached to the chute and including an engagement flange, wherein upon displacement of the chute during deployment of the inflatable restraint, the mechanism moves concurrently with the chute, thereby causing the engagement flange to move from a free-floating, at-rest position to an engagement position in which the engagement flange directly engages a structural member, said structural member being non-deforming under deployment forces of the inflatable restraint; thereby maintaining a deployment angle of the inflatable restraint.

2. The inflatable restraint module according to claim 1, wherein the engagement flange of the mechanism is spaced from the structural member approximately 3 mm when in the free-floating, at-rest position.

3. The inflatable restraint module according to claim 1, wherein the deployment angle, $\phi$, is approximately greater than or equal to 30 degrees.

4. The inflatable restraint module according to claim 1, wherein the structural member comprises a cross-car beam.

5. The inflatable restraint module according to claim 4, wherein the structural member further includes a fin that is attached to the cross-car beam, and further wherein the fin is adapted to couple the inflatable restraint canister to the cross-car beam.

6. The inflatable restraint module according to claim 1, wherein the engagement flange includes a stiffening rib.

7. The inflatable restraint module according to claim 1, wherein the engagement flange extends from a shaft portion at an angle, $\theta$, greater than or equal to 90 degrees.

8. The inflatable restraint module according to claim 1, wherein the engagement flange includes beveled portions located near a shaft portion and a nose portion.

9. The inflatable restraint module according to claim 1, wherein the engagement flange extends from a shaft portion such that the mechanism resembles a J-shape.

10. The inflatable restraint module according to claim 4, wherein said structural member further comprises a fin extending from said cross-car beam, and wherein said engagement flange engages said fin in said engagement position.

11. The inflatable restraint module according to claim 10, wherein said fin is attached to said cross-car beam.

12. An inflatable restraint module, comprising:
    an inflatable restraint canister including an opening for allowing an inflatable restraint to be deployed therethrough;
    an inflatable restraint chute having a passageway in communication with the opening of the canister; and
    a mechanism attached to the chute and including an engagement flange, wherein upon displacement of the chute during deployment of the inflatable restraint, the mechanism moves concurrently with the chute, thereby causing the engagement flange to move from a free-floating, at-rest position to an engagement position in which the engagement flange directly engages a cross-car beam, thereby maintaining a deployment angle of the inflatable restraint.

13. The inflatable restraint module according to claim 12, wherein the engagement flange of the mechanism is spaced from the cross-car beam approximately 3 mm when in the free-floating, at-rest position.

14. The inflatable restraint module according to claim 12, wherein the deployment angle, $\phi$, is approximately greater than or equal to 30 degrees.

15. The inflatable restraint module according to claim 12, wherein the cross-car beam includes a fin that interconnects the inflatable restraint canister to the cross-car beam.

16. The inflatable restraint module according to claim 12, wherein the engagement flange includes a stiffening rib.

17. The inflatable restraint module according to claim 12, wherein the engagement flange extends from a shaft portion at an angle, $\theta$, greater than or equal to 90 degrees.

18. The inflatable restraint module according to claim 12, wherein the engagement flange includes beveled portions located near a shaft portion and a nose portion.

19. The inflatable restraint module according to claim 12, wherein the engagement flange extends from a shaft portion such that the mechanism resembles a J-shape.

20. The inflatable restraint module according to claim 12, further comprising a fin extending from said cross-car beam, and wherein said engagement flange engages said fin in said engagement position.

21. The inflatable restraint module according to claim 20, wherein said fin is attached to said cross-car beam.

22. An inflatable restraint module, comprising:
    an inflatable restraint canister including an opening for allowing an inflatable restraint to be deployed therethrough;
    an inflatable restraint chute having a passageway in communication with the opening of the canister; and
    a mechanism attached to the chute and including an engagement flange, wherein upon displacement of the chute during deployment of the inflatable restraint, the mechanism moves concurrently with the chute, thereby causing the engagement flange to move from a free-floating, at-rest position to an engagement position in which the engagement flange directly engages a fin extending from a cross-car beam, thereby maintaining a deployment angle of the inflatable restraint.

23. The inflatable restraint module according to claim 22, wherein the engagement flange of the mechanism is spaced from the cross-car beam approximately 3 mm when in the free-floating, at-rest position.

24. The inflatable restraint module according to claim 22, wherein the deployment angle, $\phi$, is approximately greater than or equal to 30 degrees.

25. The inflatable restraint module according to claim 22, wherein the fin couples the inflatable restraint canister to the cross-car beam.

26. The inflatable restraint module according to claim 22, wherein the engagement flange includes a stiffening rib.

27. The inflatable restraint module according to claim 22, wherein the engagement flange extends from a shaft portion at an angle, $\theta$, greater than or equal to 90 degrees.

28. The inflatable restraint module according to claim 22, wherein the engagement flange includes beveled portions located near a shaft portion and a nose portion.

29. The inflatable restraint module according to claim 22, wherein the engagement flange extends from a shaft portion such that the mechanism resembles a J-shape.

* * * * *